(12) United States Patent
Okabe

(10) Patent No.: US 6,900,830 B2
(45) Date of Patent: May 31, 2005

(54) CRT DISPLAY DEVICE WITH IMPROVED RESISTANCE TO SPOT BUN

(75) Inventor: Hirofumi Okabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 481 days.

(21) Appl. No.: 10/021,491

(22) Filed: Oct. 30, 2001

(65) Prior Publication Data

US 2002/0054235 A1 May 9, 2002

(30) Foreign Application Priority Data

Nov. 7, 2000 (JP) .................................. 2000-007957 U

(51) Int. Cl.⁷ ................................................ H04N 3/20
(52) U.S. Cl. ......................... 348/173; 348/673; 348/379
(58) Field of Search ................... 348/173, 678, 348/379, 380, 189, 730, 673; 315/383

(56) References Cited

U.S. PATENT DOCUMENTS

| | | | | |
|---|---|---|---|---|
| 4,287,535 A | * | 9/1981 | Vakil | 348/378 |
| 4,723,167 A | * | 2/1988 | Griffey | 348/730 |
| 5,682,083 A | * | 10/1997 | Shin | 315/1 |
| 5,889,557 A | * | 3/1999 | Sato | 348/380 |

FOREIGN PATENT DOCUMENTS

| | | |
|---|---|---|
| JP | 3-58072 | 6/1991 |
| JP | 4-2169 | 1/1992 |
| JP | 8-317245 | 11/1996 |
| JP | 9-74495 | 3/1997 |
| JP | 9-266541 | 10/1997 |
| JP | 10-136223 | 5/1998 |

OTHER PUBLICATIONS

Japanese Patent Abstract Publication No. 08–317245, published on Nov. 29, 1996.
Japanese Patent Abstract Publication No. 10–136223; published on May 22, 1998.
Japanese Patent Abstract Publication No. 09–074495, published on Mar. 18, 1997.
Japanese Patent Abstract Publication No. 09–266541, published on Oct. 7, 1997.

* cited by examiner

Primary Examiner—Victor R. Kostak
(74) Attorney, Agent, or Firm—Osha & May L.L.P.

(57) ABSTRACT

A CRT display device includes an on-screen display circuit for producing a display signal displayed on-screen on a CRT and superposing said produced display signal on a video signal; a brightness restraining circuit for suppressing the brightness of CRT in a range below an upper limit value based on an anode current of CRT; and a controller for controlling the operation of the on-screen display circuit and the operation of the brightness restraining circuit, and controlling a power supply to turn on or off; wherein when a display signal having a great area ratio of higher brightness portion is a discharging display signal, said controller controls said on-screen display circuit to produce the discharging display signal, upon an instruction for turning off the power supply, and controls the power supply to turn off when the operation of the brightness restraining circuit to suppress the brightness is relieved or stopped.

5 Claims, 3 Drawing Sheets

CRT DISPLAY DEVICE WITH IMPROVED RESISTANCE TO SPOT BUN

BACKGROUND OF THE INVENTION

1. Field of the Invention

The present invention relates to a CRT display device in which a spot burn of CRT is prevented in the television receiver or CRT monitor.

2. Description of the Related Art

There was the conventional technique for preventing a spot residue of CRT as proposed in JP-A-4-2169. That is, with this technique, white peak adjusting means sends an adjusting signal for shifting compulsorily a white peak of video signal to the high brightness side to a white peak adjusting signal input section, if a signal for transfer to the stand-by state is input. Therefore, when transferring to the stand-by state, the CRT becomes luminous at high brightness, so that cumulative charges of the CRT are discharged, preventing the spot residue from occurring.

However, though by the use of the above constitution, the circuit becomes complicated, a technique for preventing the spot residue while avoiding the complication of the circuit was proposed in JP-A-8-317245. That is, in this technique, a brightness signal is led via an image quality adjusting circuit and a contrast adjusting circuit to a pedestal clamp circuit. Also, the brightness adjustment for the brightness signal is made by leading an output of the brightness adjusting circuit to the pedestal clamp circuit. Also, an ABL circuit is provided, with its output being lead to the brightness adjusting circuit, to suppress a rise in the brightness. Also, the image quality adjusting circuit, the contrast adjusting circuit and the brightness adjusting circuit are operated under the control of a microcomputer.

In the above constitution, when the power supply is turned off, the microcomputer issues an instruction for making the brightness maximum to the brightness adjusting circuit. Therefore, since the brightness of a signal sent from the pedestal clamp circuit is increased, a cathode voltage of CRT is controlled to be minimum, so that an anode current of CRT increases. In this state, the microcomputer turns off the power supply for the circuits associated with the CRT. Accordingly, when the power supply is turned off, cumulative charges of the CRT are discharged promptly, preventing the occurrence of spot residue.

However, the brightness adjusting circuit adjusts the brightness of an image displayed on the CRT to the user's taste. Accordingly, when a video signal led to the pedestal clamp circuit represents a dark image like a night view, the brightness of a signal sent from the pedestal clamp circuit may not be increased to a sufficient level, even if an instruction for increasing the brightness to the maximum is issued to the brightness adjusting circuit. In such cases, there is the risk that the discharge is not sufficient to cause the spot residue.

As described in the conventional technique as above cited, "the microcomputer 111 instructs the brightness adjusting circuit 105 to increase the brightness to the maximum, immediately before instructing to turn off the power supply", the microcomputer instructs the brightness adjusting circuit, but issues no instruction to the ABL circuit. Consequently, the operation of the brightness adjusting circuit is restrained by the operation of the ABL circuit, so that the brightness may not be increased sufficiently. And if the brightness is not increased sufficiently, the discharge is not made sufficiently, whereby there is the risk that the spot residue may occur.

SUMMARY OF THE INVENTION

This invention has been achieved to solve the above-mentioned problems, and it is an object of the invention to provide a CRT display device that can output a signal of high brightness from an on-screen circuit, and discharge the charges of the CRT completely, without being affected by the signal content of video signal, by turning off the power supply in a state where the brightness adjusting circuit is relieved or stopped to restrain the brightness of CRT.

It is another object of the invention to provide a CRT display device capable of discharging completely the charges of CRT, even when the brightness is set at a lower level, because when the power supply is turned off, the brightness adjusted by the brightness adjusting circuit is increased to a high level.

It is a further object of the invention to provide a CRT display device capable of discharging completely the charges of CRT, even when the contrast is set at a weak level, because when the power supply is turned off, the contrast is intensified.

It is another object of the invention to provide a CRT display device capable of discharging completely the charges of CRT by relieving or stopping the brightness restraining circuit to restrain the brightness and turning off the power supply in a state where the brightness is at an increased level.

Moreover, it is another object of the invention to provide a CRT display device capable of discharging completely the charges of CRT, even when the contrast is set at a weak level, because when the power supply is turned off, the contrast is intensified.

In order to accomplish the above object, according to the present invention, there is provided a CRT display device comprising an on-screen display circuit for producing a display signal that is displayed on-screen on a CRT and superposing the produced display signal on a video signal, a brightness restraining circuit for suppressing the brightness of CRT in a range below an upper limit value on the basis of an anode current of CRT, and control means for controlling the operation of the on-screen display circuit and the operation of the brightness restraining circuit, and controlling a power supply to be turned on or off, characterized in that when a display signal having a great area ratio of higher brightness portion, like a display signal for making the entire screen solid white, is a discharging display signal, the control means controls the on-screen display circuit to produce the discharging display signal, upon an instruction for turning off the power supply being given, and controls the power supply to be turned off in a state where the operation of the brightness restraining circuit to suppress the brightness is relieved or stopped.

That is, since the suppressing operation of brightness is relieved or stopped, the CRT can be luminous at a quite high brightness. Also, the CRT has a signal having a great area ratio of higher brightness portion led as a display signal. Consequently, when the power supply is turned off, the CRT can be luminous at quite high brightness over a wide range of the screen.

In addition, the CRT display device further comprises a brightness adjusting circuit for adjusting the brightness of a video signal on which the display signal is superposed to a brightness value instructed by the control means, characterized in that the control means sets the brightness adjusted by the brightness adjusting circuit to a neighboring value of the maximum brightness and then turns off the power supply, upon an instruction for turning off the power supply being given.

That is, even in the case where the brightness is set at a lower level, the brightness of signal is increased, when the power supply is turned off. Therefore, when the power supply is turned off, the CRT can be luminous at quite high brightness.

In addition, the CRT display device further comprises a contrast adjusting circuit for adjusting the contrast of a video signal on which the display signal is superposed to a contrast value instructed by the control means, characterized in that the control means sets the contrast value adjusted by the contrast adjusting circuit to a neighboring value of the maximum contrast and then turns off the power supply, upon an instruction for turning off the power supply being given.

That is, even in the case where the contrast is set at a weak level, the CRT can be increased in contrast, when the power supply is turned off. Therefore, the CRT can be luminous at quite high brightness, when the power supply is turned off.

Also, according to the invention, there is provided a CRT display device comprising a brightness adjusting circuit for adjusting the brightness of a video signal, a brightness restraining circuit for suppressing the brightness of CRT in a range below an upper limit value on the basis of an anode current of CRT, and control means for controlling the operation of the brightness adjusting circuit and controlling a power supply to be turned on or off, characterized in that the control means controls the brightness restraining circuit to relieve or stop the suppressing operation of brightness, upon an instruction for turning off the power supply being given, and controls the power supply to be turned off in a state where the brightness adjusted by the brightness adjusting circuit is set to a neighboring value of the maximum brightness.

That is, since the suppressing operation of brightness is relieved or stopped, the CRT can be luminous at quite high brightness. Also, the CRT has a signal of increased brightness led. As a result, when the power supply is turned off, the CRT can be luminous at quite high brightness.

In addition, the CRT display device further comprises a contrast adjusting circuit for adjusting the contrast of the video signal to a contrast value instructed by the control means, in which the brightness of the video signal with the contrast adjusted is adjusted by the brightness adjusting circuit, characterized in that the control means sets the contrast adjusted by the contrast adjusting circuit to a neighboring value of the maximum contrast and then turns off the power supply, upon an instruction for turning off the power supply being given.

That is, even in the case where the contrast is set at a weak level, the CRT is increased in contrast, when the power supply is turned off. Therefore, the CRT can be luminous at quite high brightness, when the power supply is turned off.

DETAILED DESCRIPTION OF THE PREFERRED EMBODIMENTS

The preferred embodiments of the present invention will be described below with reference to the accompanying drawings.

Figure 1:
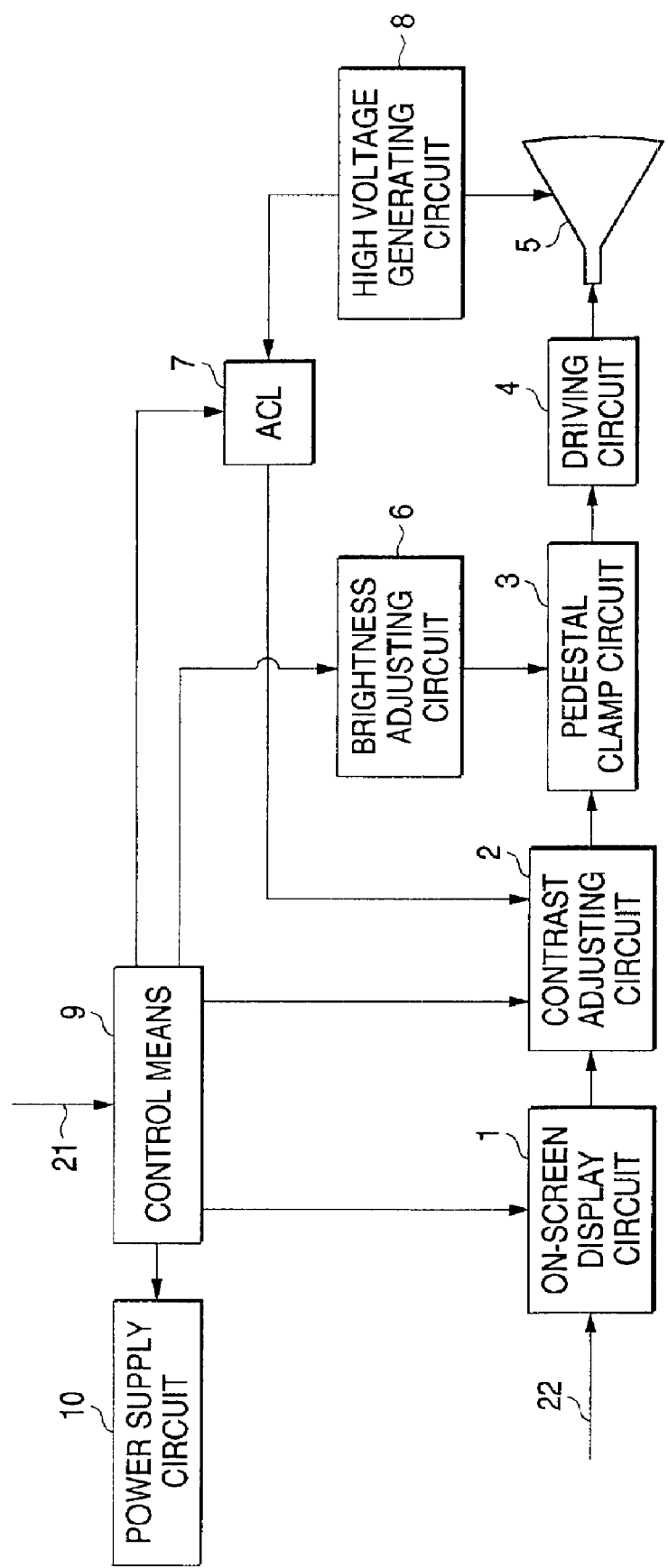
FIG. 1 is a block diagram showing the electrical configuration of a CRT display device according to a first embodiment of the present invention.

FIG. 1 is a block diagram showing the electrical configuration of a CRT display device according to a first embodiment of the invention, which is used in a television receiver.

In FIG. 1, an on-screen display circuit 1 is a block for superposing a display signal for on-screen display on a video signal 22 sent from a video signal processing circuit, not shown. And the video signal on which the display signal is superposed is sent to a contrast adjusting circuit 2. The contrast adjusting circuit 2 is a block for adjusting the contrast of the video signal output from the on-screen display circuit 1 to the contrast value instructed by control means 9. And the video signal having the contrast adjusted is sent to a pedestal clamp circuit 3.

The pedestal clamp circuit 3 is a block for reproducing a DC level of the video signal. And the video signal having the DC level reproduced is sent to a driving circuit 4. A brightness adjusting circuit 6 is a block for adjusting the brightness of the video signal sent to the driving circuit 4 to the brightness value instructed by the control means 9 by controlling the DC level reproduced in the pedestal clamp circuit 3. The driving circuit 4 is a block for amplifying the video signal sent from the pedestal clamp circuit 3 to generate a drive signal of three primary colors RGB and sending the primary color drive signal to each of three cathodes of a CRT 5.

A high voltage generating circuit 8 is a block for generating a high voltage applied on an anode of the CRT 5. Also, a signal indicating an anode current of the CRT 5 is sent to an ACL (Automatic Contrast Loop). The ACL 7 provides a brightness restraining circuit for suppressing the brightness of the CRT 5 in a range below the upper limit value on the basis of the anode current of the CRT 5. That is, if the value of the anode current of the CRT 5 is about to exceed a preset value, the brightness of the CRT 5 is controlled not to exceed the upper limit value by decreasing the contrast adjusted by the contrast adjusting circuit 2.

A power supply circuit 10 is a block for supplying an operating power supply to the on-screen circuit 1, the contrast adjusting circuit 2, the pedestal clamp circuit 3, the driving circuit 4, the brightness adjusting circuit 6, the ACL 7 and the voltage generating circuit 8.

The control means 9 is a block composed of a microcomputer to control a main operation as a television receiver. That is, it controls the operation of the on-screen circuit 1 to control the display contents displayed on-screen on the CRT 5. Also, it controls the contrast adjusting circuit 2 to set the contrast of the video displayed on the CRT 5 to a contrast value instructed by the user. Also, it controls the brightness adjusting circuit 6 to set the brightness of the video displayed on the CRT 5 to a brightness value instructed by the user.

Also, the control means 9 controls the operation of each of the on-screen display circuit 1, the contrast adjusting circuit 2, the brightness adjusting circuit 6 and the ACL 7, when the power supply is turned off (i.e., when the operation of the power supply circuit 10 is stopped), thereby preventing the spot residue from occurring on the CRT 5.

Figure 2:
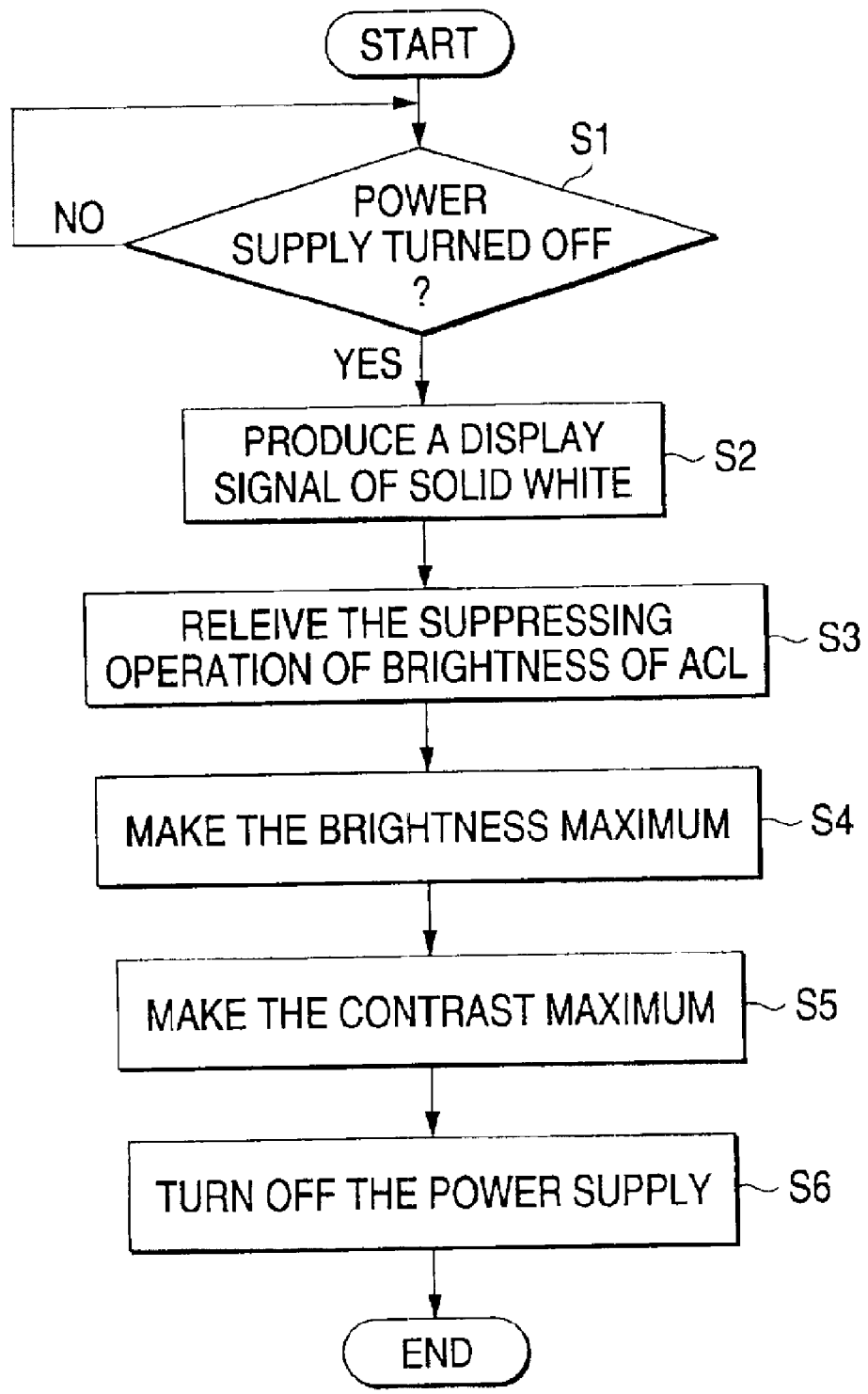
FIG. 2 is a flowchart showing a main operation of the first embodiment when the power supply is turned off.

FIG. 2 is a flowchart showing a main operation of the first embodiment when the power supply is turned off. The main operation of the first embodiment will be now described with reference to FIG. 2, as needed.

When an input 21 of a user's operation indicates that the power supply is turned off, the control means 9 controls the on-screen display circuit 1 to produce a solid white signal (i.e., a signal with uniform 90% brightness on the entire screen) that is a discharging display signal (steps S1, S2). As a result, a video signal sent from the on-screen display circuit 1 to the contrast adjusting circuit 2 has a 90% brightness over the entire screen, irrespective of the contents of the video signal 22.

The discharging display signal is not limited to the solid white signal, but may be arbitrary display signal so far as the area ratio of a higher brightness portion (e.g., a portion with 80% or more brightness) of the signal is increased (e.g., to 50% or greater) on the screen of the CRT 5.

Also, the control means 9 relieves the operation for suppressing the brightness of the ACL 7 (step S3). Therefore, assuming the brightness of the CRT 5 when the ACL 7 starts to suppress the brightness is A, before relieving the suppressing operation, the ACL 7 does not suppress the brightness of the CRT 5 up to the brightness B that is sufficiently higher than the brightness A, when the suppressing operation of brightness is placed in a relieved state. Consequently, the CRT 5 is placed in a state where it can be luminous at quite high brightness.

The control means 9 controls the brightness adjusting circuit 6 so that the brightness may be highest (step S4). Also, the control means 9 controls the contrast adjusting circuit 2 so that the contrast may be maximum (step S5). Thereafter, the control means 9 controls the power supply to be turned off by stopping the operation of a power supply circuit 10 (step S6).

As a result of the operation, the screen of the CRT 5 reaches a quite high brightness, when the power supply is turned from on state to off state, irrespective of whether the video signal 22 represents a dark image, or the brightness is set to be low or the contrast is set to be weak by the user. Accordingly, when the power supply is turned off, charges stored in the CRT 5 are fully discharged in a quite short time, preventing the spot residue from occurring.

The first embodiment has been thus described above, and next a second embodiment will be described below.

The electrical configuration of the second embodiment is the same as that of the first embodiment, except for the control means 9. The control means 9 of the second embodiment is the same as that of the first embodiment, except for the control operation when the power supply is turned from on state to off state.

That is, the control means 9 controls the operation of the on-screen display circuit 1 in the same manner as the first embodiment, to control the display contents displayed on-screen on the CRT 5. Also, it controls the contrast adjusting circuit 2 to set the contrast of the video displayed on the CRT 5 to a contrast value instructed by the user. Also, it controls the brightness adjusting circuit 6 to set the brightness of the video displayed on the CRT 5 to a brightness value instructed by the user.

On one hand, when the power supply is turned off (i.e., the operation of the power supply circuit 10 is stopped), the control means 9 does not control the operation of the on-screen display circuit 1, and only controls the operation of each of the contrast adjusting circuit 2, the brightness adjusting circuit 6 and the ACL 7, thereby preventing the spot residue from occurring on the CRT 5.

Figure 3:
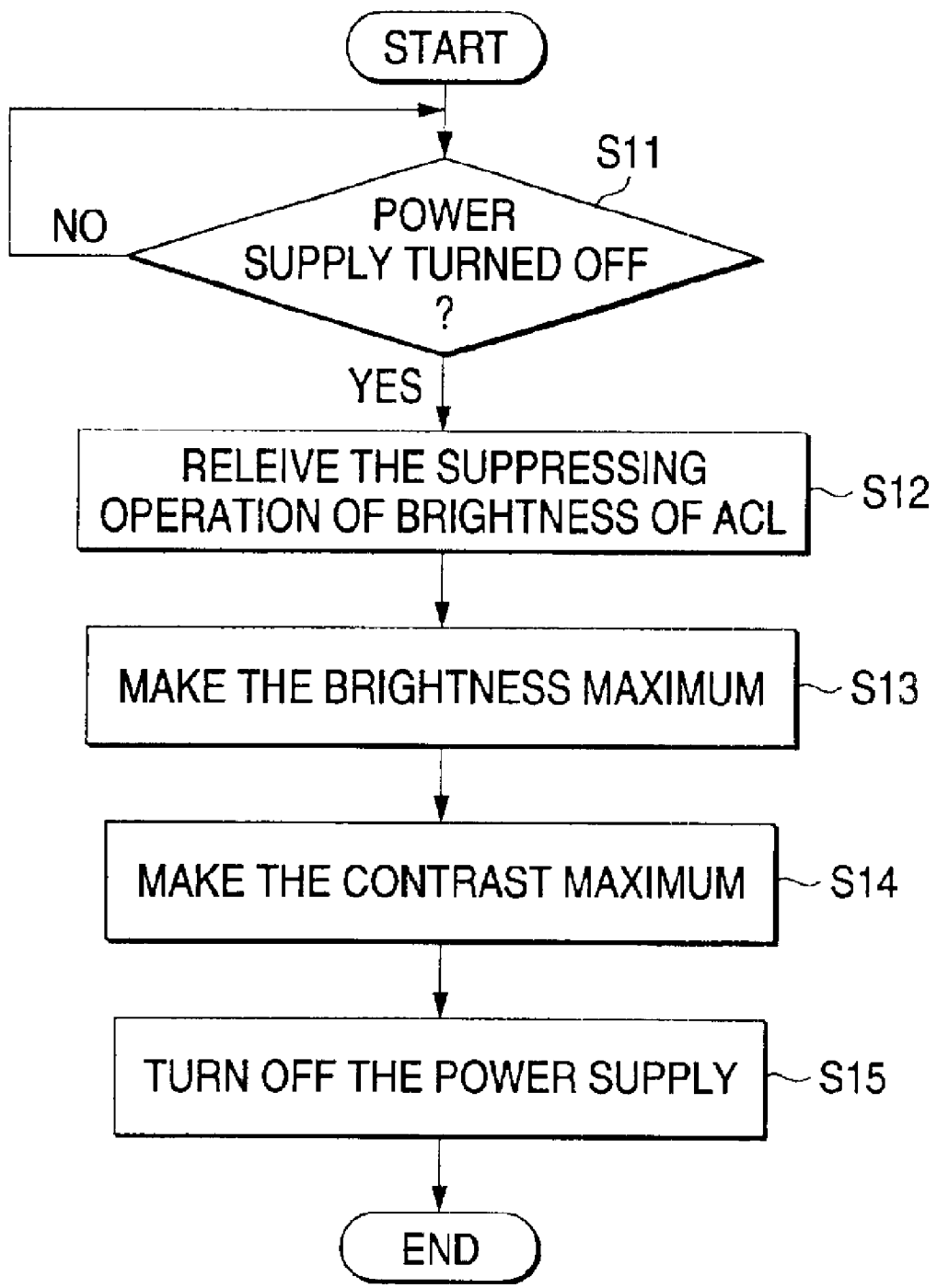
FIG. 3 is a flowchart showing a main operation of the second embodiment when the power supply is turned off.

FIG. 3 is a flowchart showing a main operation of the second embodiment when the power supply is turned off. The main operation of the second embodiment will be now described with reference to FIG. 3, as needed.

When an input 21 of a user's operation indicates that the power supply is turned off, the control means 9 relieves the operation for suppressing the brightness of the ACL 7 (steps S11, S12). Therefore, assuming the brightness of the CRT 5 when the ACL 7 starts to suppress the brightness is A, before relieving the suppressing operation, the ACL 7 does not suppress the brightness of the CRT 5 up to the brightness B that is sufficiently higher than the brightness A, when the suppressing operation of brightness is placed in a relieved state. Consequently, the CRT 5 is placed in a state where it can be luminous at quite high brightness.

The control means 9 controls the brightness adjusting circuit 6 so that the brightness may be highest (step S13). Also, the control means 9 controls the contrast adjusting circuit 2 so that the contrast may be maximum (step S14). Thereafter, the control means 9 controls the power supply to be turned off by stopping the operation of the power supply circuit 10 (step S15).

Consequently, the screen of the CRT 5 reaches a quite high brightness, when the power supply is turned from on state to off state, irrespective of whether the brightness is set to be low or the contrast is set to be weak. Accordingly, when the power supply is turned off, charges stored in the CRT 5 are fully discharged in a quite short time, preventing the spot residue from occurring.

At step S3 or S12, the control means controls the ACL 7 to relieve the suppressing operation of brightness, but may control the ACL 7 to stop the operation, namely, to stop the suppressing operation of brightness on the CRT 5.

While the brightness restraining circuit is the ACL, it may be an ABL (Automatic Bright Loop) for suppressing the brightness of the CRT 5 in a range below the upper limit value by decreasing the brightness.

As described above, in the CRT display device according to the present invention, when a display signal having a great area ratio of higher brightness portion, like a display signal for making the entire screen solid white, is a discharging display signal, the control means controls the on-screen display circuit to produce the discharging display signal, upon an instruction for turning off the power supply being given, and controls the power supply to be turned off in a state where the operation of the brightness restraining circuit to suppress the brightness is relieved or stopped. Accordingly, when the power supply is turned off, the CRT can be luminous at quite high brightness over a wide range of the screen, irrespective of the state of video signal, so that the charges of the CRT can be discharged completely without being affected by the signal contents of the video signal.

Further, the CRT display device according to the invention further comprises a brightness adjusting circuit for adjusting the brightness of a video signal on which the display signal is superposed to a brightness value instructed by the control means, wherein the control means sets the brightness adjusted by the brightness adjusting circuit to a neighboring value of the maximum brightness and then turns off the power supply, upon an instruction for turning off the power supply being given. Accordingly, even in the case where the brightness is set at a lower level, the brightness of signal is increased, when the power supply is turned off. Therefore, when the power supply is turned off, the CRT can be luminous at quite high brightness, so that the charges of the CRT can be discharged completely.

Further, the CRT display device according to the invention further comprises a contrast adjusting circuit for adjusting the contrast of a video signal on which the display signal is superposed to a contrast value instructed by the control means, wherein the control means sets the contrast value adjusted by the contrast adjusting circuit to a neighboring value of the maximum contrast and then turns off the power supply, upon an instruction for turning off the power supply being given. Accordingly, even in the case where the contrast is set at a weak level, the CRT can be increased in contrast, when the power supply is turned off. Therefore, the CRT can be luminous at quite high brightness, when the power supply is turned off, so that the charges of the CRT can be discharged completely.

A CRT display device according to this invention comprises a brightness adjusting circuit for adjusting the brightness of a video signal, a brightness restraining circuit for suppressing the brightness of CRT in a range below an upper limit value on the basis of an anode current of CRT, and control means for controlling the operation of the brightness adjusting circuit and controlling a power supply to be turned on or off, wherein the control means controls the brightness restraining circuit to relieve or stop the suppressing operation of brightness, upon an instruction for turning off the power supply being given, and controls the power supply to be turned off in a state where the brightness adjusted by the brightness adjusting circuit is set to a neighboring value of the maximum brightness. Accordingly, when the power supply is turned off, the CRT can be luminous at quite high brightness, so that the charges of the CRT can be discharged completely.

In addition, the CRT display device further comprises a contrast adjusting circuit for adjusting the contrast of the video signal to a contrast value instructed by the control means, the brightness of the video signal with the contrast adjusted being adjusted by the brightness adjusting circuit, wherein the control means sets the contrast adjusted by the contrast adjusting circuit to a neighboring value of the maximum contrast and then turns off the power supply, upon an instruction for turning off the power supply being given. Accordingly, even in the case where the contrast is set at a weak level, the CRT is increased in contrast, when the power supply is turned off. Therefore, the CRT can be luminous at quite high brightness, when the power supply is turned off, so that the charges of the CRT can be discharged completely.

What is claimed is:

1. A CRT display device comprising:
   an on-screen display circuit for producing a display signal that is displayed on-screen on a CRT and superposing said produced display signal on a video signal;
   a brightness restraining circuit for suppressing the brightness of CRT in a range below an upper limit value on the basis of an anode current of CRT; and
   a controller for controlling the operation of said on-screen display circuit and the operation of said brightness restraining circuit, and controlling a power supply to be turned on or off;
   wherein when a display signal having at least a 50 percent area ratio of higher brightness portion is a discharging display signal, said controller controls said on-screen display circuit to produce the discharging display signal, upon an instruction for turning off the power supply being given, and controls the power supply to be turned off in a state where the operation of said brightness restraining circuit to suppress the brightness is relieved or stopped.

2. The CRT display device according to claim 1, further comprising a brightness adjusting circuit for adjusting the brightness of a video signal on which said display signal is superposed to a brightness value instructed by said controller;
   wherein said controller sets the brightness adjusted by said brightness adjusting circuit to a neighboring value to the maximum brightness and then turns off the power supply, upon an instruction for turning off the power supply being given.

3. The CRT display device according to claim 2, further comprising a contrast adjusting circuit for adjusting the contrast of a video signal on which said display signal is superposed to a contrast value instructed by said controller.

4. A CRT display device comprising:
   a brightness adjusting circuit for adjusting the brightness of a video signal;
   a brightness restraining circuit for suppressing the brightness of CRT in a range below an upper limit value on the basis of an anode current of CRT; and
   a controller for controlling the operation of said brightness adjusting circuit and controlling a power supply to be turned on or off;
   wherein said controller controls said brightness restraining circuit to relieve or stop the suppressing operation of brightness, upon an instruction for turning off the power supply being given, and controls the power supply to be turned off in a state where the brightness adjusted by said brightness adjusting circuit is set to a neighboring value of the maximum brightness.

5. The CRT display device according to claim 4, further comprising a contrast adjusting circuit for adjusting the contrast of said video signal to a controls value instructed by said controller, in which the brightness of the video signal with the contrast adjusted is adjusted by said brightness adjusting signal;
   wherein said controller sets the contrast adjusted by said contrast adjusting circuit to a neighboring value of the maximum contrast and then turns off the power supply, upon an instruction for turning off the power supply being given.

* * * * *

UNITED STATES PATENT AND TRADEMARK OFFICE
CERTIFICATE OF CORRECTION

PATENT NO. : 6,900,830 B2
DATED : May 31, 2005
INVENTOR(S) : Hirofumi Okabe

It is certified that error appears in the above-identified patent and that said Letters Patent is hereby corrected as shown below:

<u>Title page, Item [54] and Column 1, lines 1-2,</u>
Title, please replace "CRT DISPLAY DEVICE WITH IMPROVED RESISTANCE TO SPOT BUN" with -- CRT DISPLAY DEVICE WITH IMPROVED RESISTANCE TO SPOT BURN --.

Signed and Sealed this

Twenty-third Day of August, 2005

JON W. DUDAS
*Director of the United States Patent and Trademark Office*